US007552312B2

(12) United States Patent
Archer et al.

(10) Patent No.: US 7,552,312 B2
(45) Date of Patent: Jun. 23, 2009

(54) IDENTIFYING MESSAGING COMPLETION IN A PARALLEL COMPUTER BY CHECKING FOR CHANGE IN MESSAGE RECEIVED AND TRANSMITTED COUNT AT EACH NODE

(75) Inventors: Charles J. Archer, Rochester, MN (US); Camesha R. Hardwick, Fayetteville, NC (US); Patrick J. McCarthy, Rochester, MN (US); Brian P. Wallenfelt, Eden Prairie, MN (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 11/672,989

(22) Filed: Feb. 9, 2007

(65) Prior Publication Data

US 2008/0195840 A1 Aug. 14, 2008

(51) Int. Cl.
*G06F 15/16* (2006.01)
(52) U.S. Cl. .............................. 712/32; 712/10; 719/313
(58) Field of Classification Search ........................ None
See application file for complete search history.

(56) References Cited

U.S. PATENT DOCUMENTS 5,920,705 A * 7/1999 Lyon et al. .................. 709/240

6,789,258 B1 * 9/2004 Zak et al. .................... 719/317

* cited by examiner

*Primary Examiner*—Kenneth S Kim
(74) *Attorney, Agent, or Firm*—Biggers & Ohanian, LLP (57) ABSTRACT

Methods, parallel computers, and products are provided for identifying messaging completion on a parallel computer. The parallel computer includes a plurality of compute nodes, the compute nodes coupled for data communications by at least two independent data communications networks including a binary tree data communications network optimal for collective operations that organizes the nodes as a tree and a torus data communications network optimal for point to point operations that organizes the nodes as a torus. Embodiments include reading all counters at each node of the torus data communications network; calculating at each node a current node value in dependence upon the values read from the counters at each node; and determining for all nodes whether the current node value for each node is the same as a previously calculated node value for each node. If the current node is the same as the previously calculated node value for all nodes of the torus data communications network, embodiments include determining that messaging is complete and if the current node is not the same as the previously calculated node value for all nodes of the torus data communications network, embodiments include determining that messaging is currently incomplete.

20 Claims, 6 Drawing Sheets

IDENTIFYING MESSAGING COMPLETION IN A PARALLEL COMPUTER BY CHECKING FOR CHANGE IN MESSAGE RECEIVED AND TRANSMITTED COUNT AT EACH NODE

GOVERNMENT RIGHTS IN INVENTION

This invention was made with Government support under Contract No. B519700 awarded by the Department of Energy. The Government has certain rights in this invention.

BACKGROUND OF THE INVENTION

1. Field of the Invention

The field of the invention is data processing, or, more specifically, methods, parallel computers, and products for identifying messaging completion on a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point geometrically aware diagnostics, but a tree network typically is inefficient in point to point communication. A tree network, however, does provide high bandwidth and low latency for certain collective operations, message passing operations where all compute nodes participate simultaneously.

Some operations on parallel computers, such as for example, checkpointing and checksumming often require that all messages on all networks have completed for proper functioning. Checkpointing writes the contents of memory out to disk in a format that allows it to be reloaded so that the program may restart from the same spot. Other algorithms for process migration will require this as well.

Parallel computers often use hardware routing rather than a "store and forward" messaging. In such cases, when a message has been injected into the network, software on a node is not notified until the message reaches its destination node. In this case, software checkpointing or checksumming, for example, can erroneously begin without sending and receiving all of the messages on the node. Without determining whether all messages have been received in their destination nodes there is the risk of errors for such operations that require message completion.

SUMMARY OF THE INVENTION

Methods, parallel computers, and products are provided for identifying messaging completion on a parallel computer. The parallel computer includes a plurality of compute nodes, the compute nodes coupled for data communications by at least two independent data communications networks including a binary tree data communications network optimal for collective operations that organizes the nodes as a tree and a torus data communications network optimal for point to point operations that organizes the nodes as a torus. Embodiments include reading all counters at each node of the torus data communications network; calculating at each node a current node value in dependence upon the values read from the counters at each node; and determining for all nodes whether the current node value for each node is the same as at least one previously calculated node value for each node. If the current node is the same as the previously calculated node value for all nodes of the torus data communications network, embodiments include determining that messaging is complete and if the current node is not the same as the previously calculated node value for all nodes of the torus data communications network, embodiments include determining that messaging is currently incomplete.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
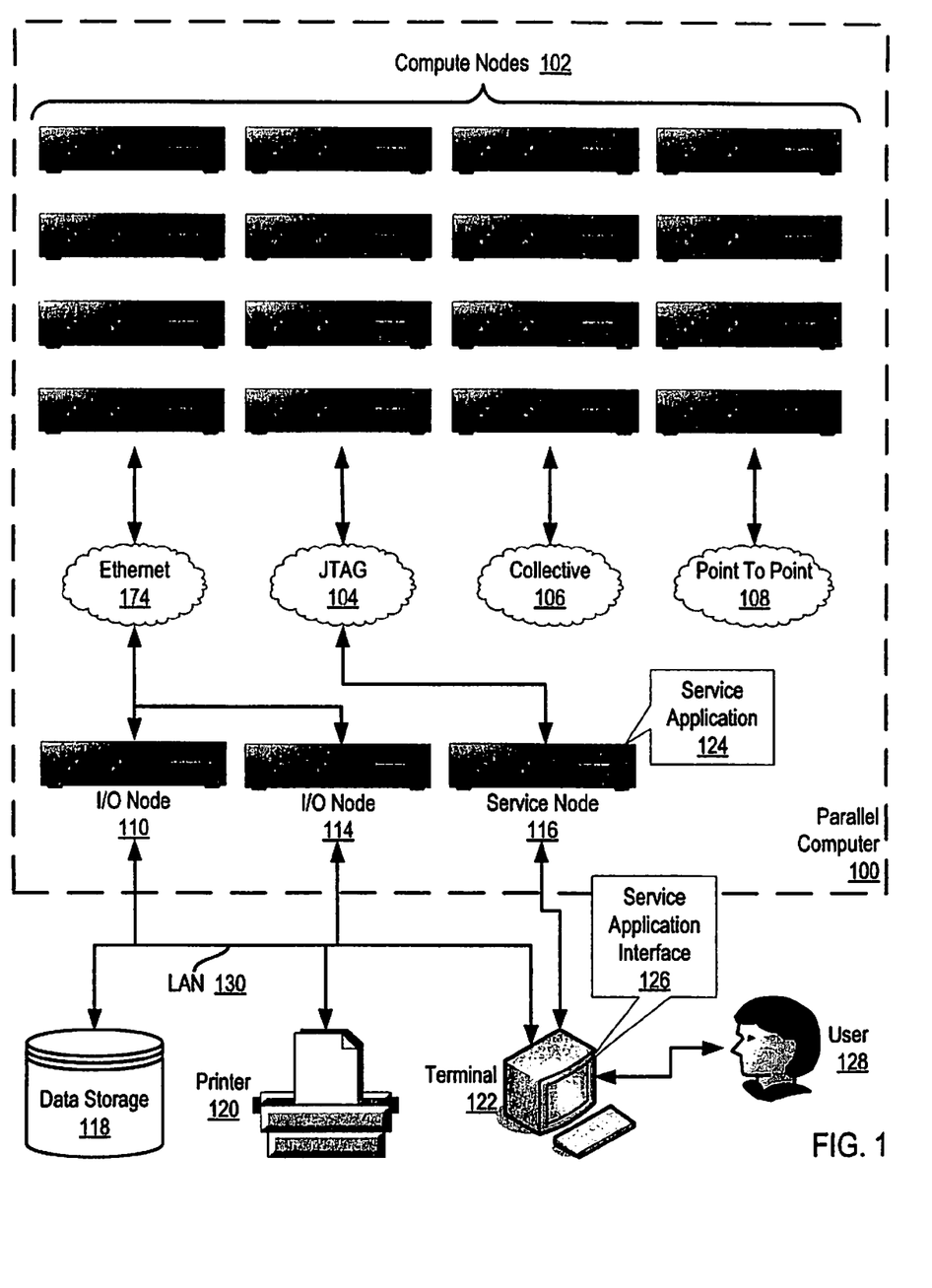
FIG. 1 illustrates an exemplary system for identifying messaging completion on a parallel computer according to embodiments of the present invention.

Exemplary methods, parallel computers, and computer program products for identifying messaging completion on a parallel computer according to embodiments of the present invention are described with reference to the accompanying drawings, beginning with FIG. 1. FIG. 1 illustrates an exemplary system for identifying messaging completion on a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a collective operations network (106), and a point to point operations network (108). Collective operations network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

As described in more detail below in this specification, the system of FIG. 1 operates generally to identifying messaging completion on a parallel computer according to the present invention. The system of FIG. 1 identifies messaging completion on a parallel computer by reading all counters at each node of the torus data communications network; calculating at each node a current node value in dependence upon the values read from the counters at each node; and determining for all nodes whether the current node value for each node is the same as at least one previously calculated node value for each node. If the current node is the same as the previously calculated node value for all nodes of the torus data communications network, identifying messaging completion includes determining that messaging is complete and if the current node is not the same as the previously calculated node value for all nodes of the torus data communications network, identifying messaging completion includes determining that messaging is currently incomplete.

In addition to compute nodes, computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). A processing set is an I/O node and a plurality of compute nodes associated with that I/O node.

Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

A collective operation is an operation, a message-passing computer program instruction that is executed simultaneously, that is, at approximately the same time, by all the compute nodes in a 'plurality' or 'group' of compute nodes. Such a plurality or group of compute nodes may include all the compute nodes in the parallel computer (100) or a subset all the compute nodes. In MPI terminology, such a 'plurality' or 'group' may be defined as a 'communicator.'

'MPI' refers to 'Message Passing Interface,' a parallel communications library, a module of computer program instructions for data communications on parallel computers. Examples of parallel communications libraries that may be improved for use in identifying messaging completion on a parallel computer according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Collective operations are composed of many point-to-point messages executed more or less concurrently (depending on the operation and the internal algorithm) and involve all processes running in a given group of compute nodes, that is, in a given MPI communicator. Every process on every compute node in the group must call or execute the same collective operation at approximately the same time. The required simultaneity is described as approximate because many processes running on many separate, physical compute node cannot be said to do anything all together at exactly the same time. Parallel communications libraries provide functions to support synchronization. In the MPI example, such a synchronization function is a 'barrier' routine. To synchronize, all processes on all compute nodes in a group call MPI_barrier( ), for example, and then all processes wait until all processes reach the same point in execution. Then execution continues, with substantial synchronization.

Most collective operations are variations or combinations of four basic operations: broadcast, gather, scatter, and reduce. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. All processes specify the same receive count. The send arguments are only significant to the root process, whose buffer actually contains sendcount * N elements of a given datatype, where N is the number of processes in the given group of compute nodes. The send buffer will be divided equally and dispersed to all processes (including itself). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

The arrangement of nodes, networks, and I/O devices making up the exemplary system illustrated in FIG. 1 are for explanation only, not for limitation of the present invention. Data processing systems capable of identifying messaging completion on a parallel computer according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of identifying messaging completion on a parallel computer according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Identifying messaging completion on a parallel computer according to embodiments of the present invention is generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of identifying messaging completion on a parallel computer according to embodiments of the present invention. The compute node (152) of FIG. 2 includes at least one computer processor (164) as well as random access memory ('RAM') (156). Processor (164) is connected to RAM (156) through a high-speed memory bus (154) and through a bus adapter (194) and a extension bus (168) to other components of the compute node.

Figure 2:
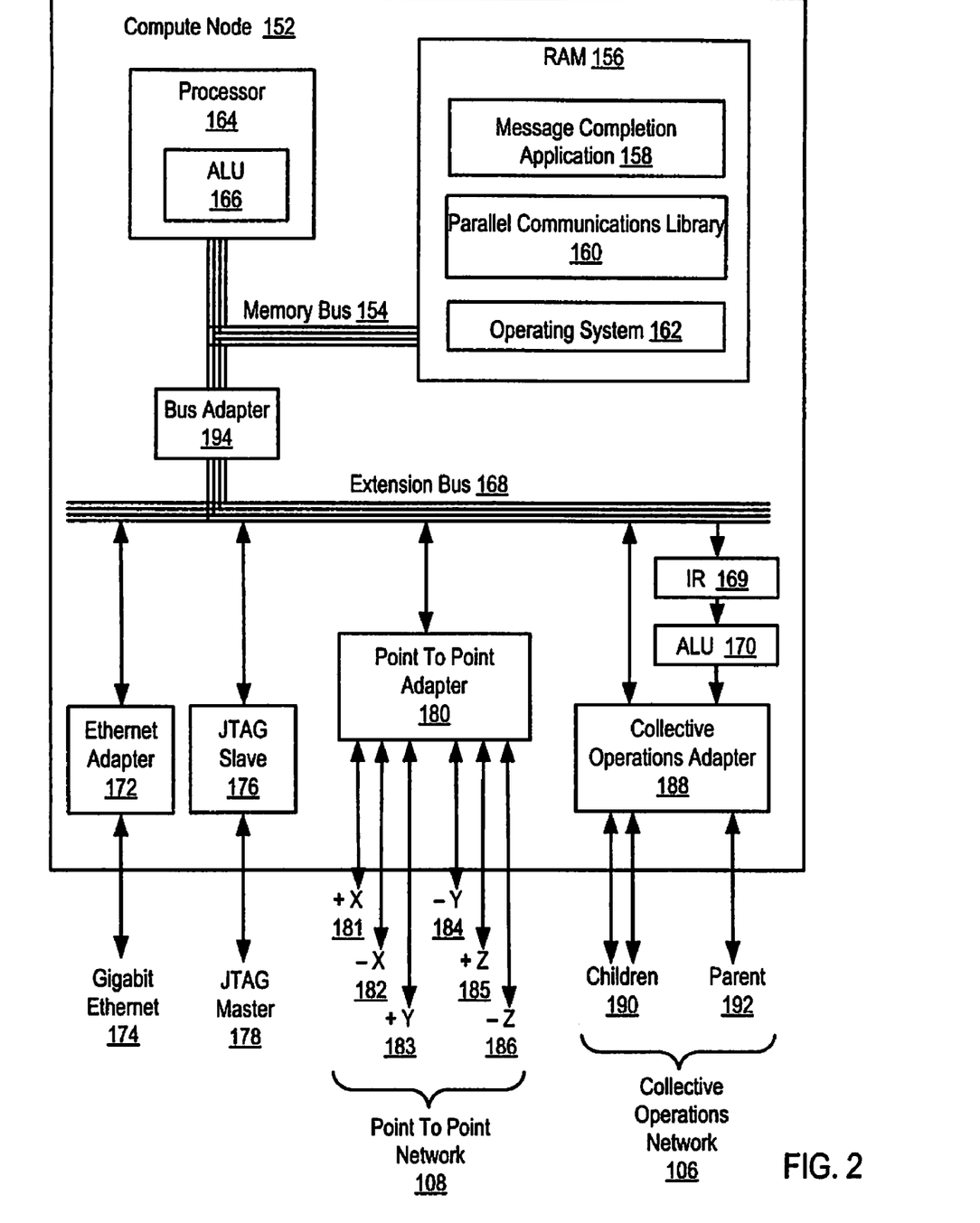
FIG. 2 sets forth a block diagram of an exemplary compute node useful in identifying messaging completion on a parallel computer according to embodiments of the present invention.

Stored in RAM (156) is a message completion application program (158), a module of computer program instructions that carries out parallel, user-level data processing using parallel algorithms. Message completion application program (158) contains computer program instructions that operate, along with other programs on other compute nodes in a parallel computer, to identifying messaging completion on a parallel computer according to embodiments of the present invention by reading all counters at each node of the torus data communications network; calculating at each node a current node value in dependence upon the values read from the counters at each node; and determining for all nodes whether the current node value for each node is the same as at least one previously calculated node value for each node. If the current node is the same as the previously calculated node value for all nodes of the torus data communications network, identifying messaging completion includes determining that messaging is complete and if the current node is not the same as the previously calculated node value for all nodes of the torus data communications network, identifying messaging completion includes determining that messaging is currently incomplete.

Also stored RAM (156) is a parallel communications library (160), a library of computer program instructions that carry out parallel communications among compute nodes, including point to point operations as well as collective operations. Application program (158) executes collective operations by calling software routines in parallel communications library (160). A library of parallel communications routines may be developed from scratch for use in identifying messaging completion according to embodiments of the present invention, using a traditional programming language such as the C programming language, and using traditional programming methods to write parallel communications routines that send and receive data among nodes on two independent data communications networks. Alternatively, existing prior art libraries may be used. Examples of parallel communications libraries that may be improved for identifying messaging completion include the 'Message Passing Interface' ('MPI') library and the 'Parallel Virtual Machine' ('PVM') library. However it is developed, the parallel communications routines of parallel communication library (160) may be improved for identifying messaging completion according to embodiments of the present invention by reading all counters at each node of the torus data communications network; calculating at each node a current node value in dependence upon the values read from the counters at each node; and determining for all nodes whether the current node value for each node is the same as at least one previously calculated node value for each node. If the current node is the same as the previously calculated node value for all nodes of the torus data communications network, identifying messaging completion includes determining that messaging is complete and if the current node is not the same as the previously calculated node value for all nodes of the torus data communications network, identifying messaging completion includes determining that messaging is currently incomplete.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex that those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for identifying messaging completion on a parallel computer include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in Identifying messaging completion on a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Collective Operations Adapter (188) that couples example compute node (152) for data communications to a network (106) that is optimal for collective message passing operations such as, for example, a network configured as a binary tree. Collective Operations Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of collective operations adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, collective operations adapter (188) may execute the arithmetic or logical operation by use of ALU (166) in processor (164) or, typically much faster, by use dedicated ALU (170).

Figure 3A:
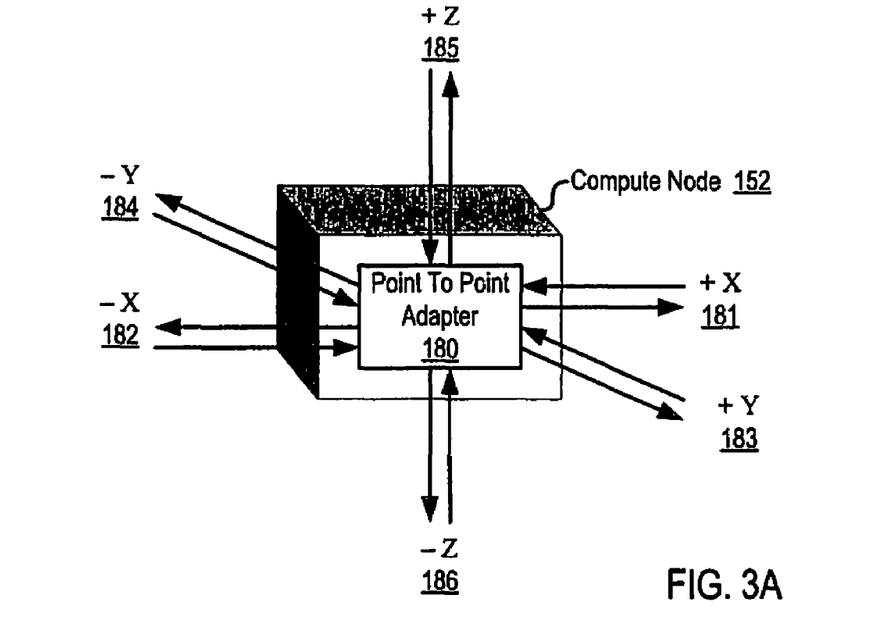
FIG. 3A illustrates an exemplary Point-To-Point Adapter useful in systems that identify messaging completion on a parallel computer according to embodiments of the present invention.

For further explanation, FIG. 3A illustrates an exemplary Point To Point Adapter (180) useful in systems that identify messaging completion on a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185).

Figure 3B:
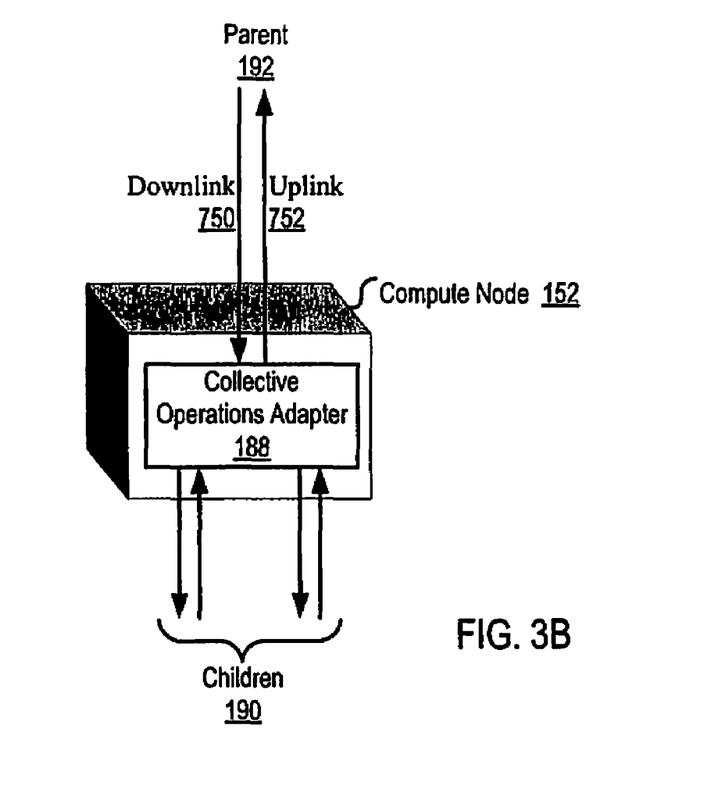
FIG. 3B illustrates an exemplary Collective Operations Adapter useful in systems that identify messaging completion on a parallel computer according to embodiments of the present invention.

For further explanation, FIG. 3B illustrates an exemplary Collective Operations Adapter (188) useful in systems that identify messaging completion on a parallel computer according to embodiments of the present invention. Collective Operations Adapter (188) is designed for use in a network optimized for collective operations, a network that organizes compute nodes of a parallel computer in a binary tree. Collective Operations Adapter (188) in the example of FIG. 3B provides data communication to and from two children nodes through four unidirectional data communications links (190). Collective Operations Adapter (188) also provides data communication to and from a parent node through two unidirectional data communications links (192).

Figure 4:
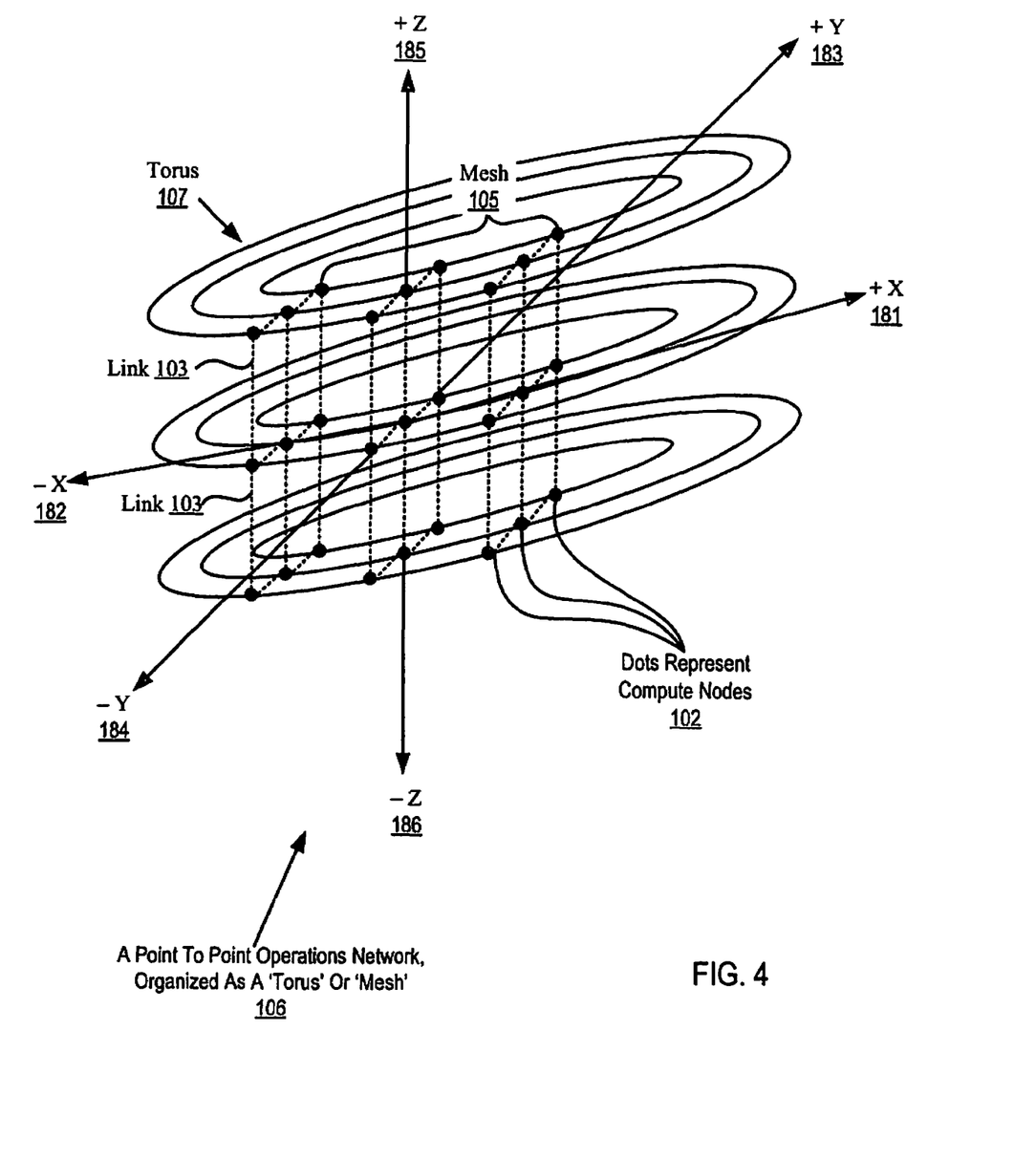
FIG. 4 illustrates an exemplary data communications network optimized for point to point operations.

For further explanation, FIG. 4 illustrates an exemplary data communications network optimized for point to point operations (106). In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105) that wraps around to form a torus (107). Each compute node in the torus has a location in the torus that is uniquely specified by a set of x, y, z coordinates. For clarity of explanation, the data communications network of FIG. 4 is illustrated with only 27 compute nodes, but readers will recognize that a data communications network optimized for point to point operations in accordance with embodiments of the present invention may contain only a few compute nodes or may contain thousands of compute nodes.

Figure 5:
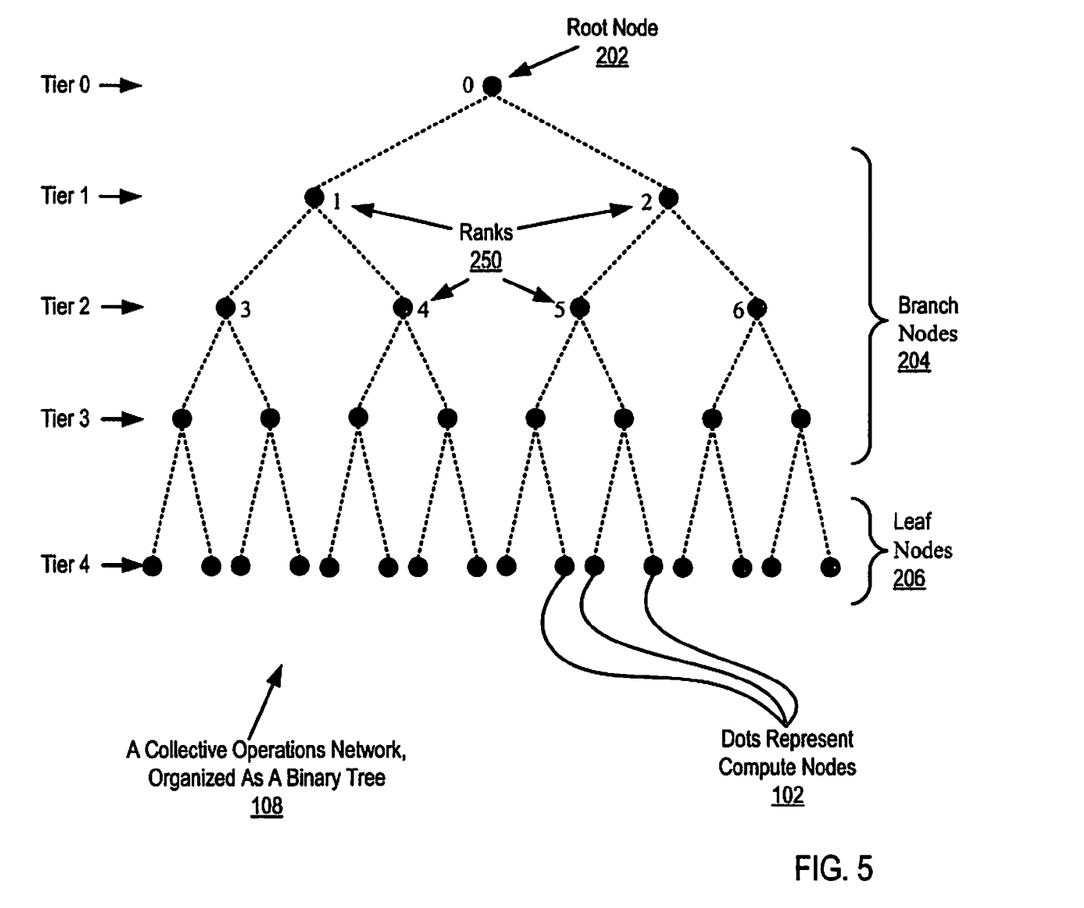
FIG. 5 illustrates an exemplary data communications network optimized for collective operations.

For further explanation, FIG. 5 illustrates an exemplary data communications network optimized for collective operations (108). The example data communications network of FIG. 5 includes compute nodes data communications links connected to the compute nodes so as to organize the compute nodes as a tree. In the example of FIG. 5, dots represent compute nodes (102) of a parallel computer, and the dotted lines between the dots represent data communications links between compute nodes. The data communications links are implemented with collective operations data communications adapters similar to the one illustrated for example in FIG. 3B, with each node typically providing data communications to and from two children nodes and data communications to and from a parent node, with some exceptions. Nodes in a binary tree may be characterized as a root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (108). For clarity of explanation, the data communications network of FIG. 5 is illustrated with only 31 compute nodes, but readers will recognize that a data communications network optimized for collective operations for use in identifying messaging completion on a parallel computer in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

In the example of FIG. 5, the tree network (108) is characterized by a root compute node (202) and a plurality of tiers of compute nodes, Tier 0, Tier 1, and so on. The tiers of compute nodes are defined by the number of data communications links between the compute nodes of a tier and the root compute node (202). The compute node in Tier 0 has zero data communications links between the compute nodes in Tier 0 and the root node (202)—which is the only compute node in Tier 0. Each compute node in Tier 1 has one data communications link between it and the root node (202). Each compute node in Tier 2 has two data communications links between it and the root node (202). And so on.

The tiers of the network tree of FIG. 5 are numbered in integer sequence beginning with the tier containing the root node as Tier 0 and continuing with Tier 1, Tier 2, and so on. The fact that the tiers are numbered in integer sequence means that the tiers of compute nodes in the example of FIG. 5 include even-numbered tiers of compute nodes and odd-numbered tiers of compute nodes. Even-numbered tiers include Tier 0, Tier 2, and so on. Odd-numbered tiers include Tier 1, Tier 3, and so on.

Figure 6:
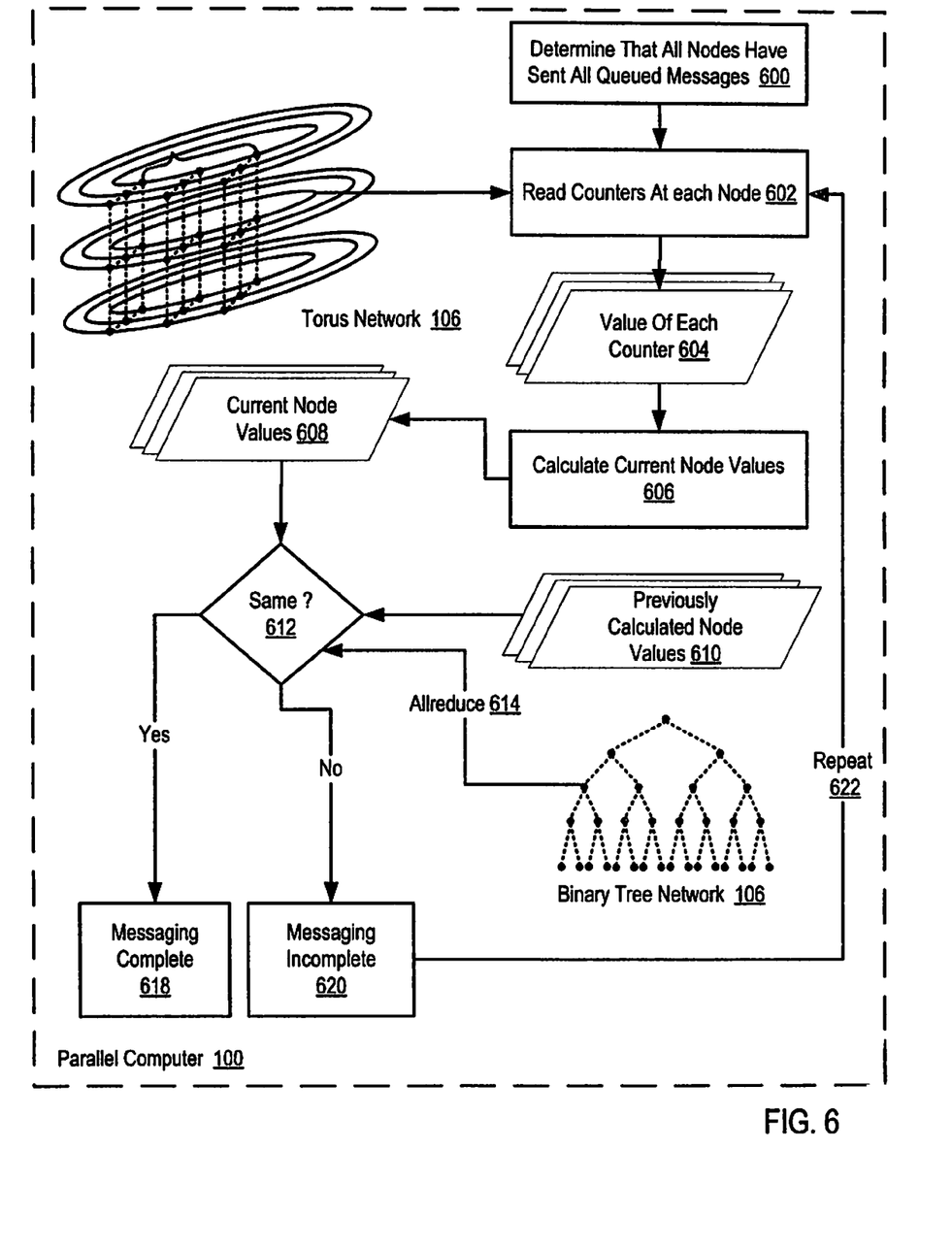
FIG. 6 sets forth a flow chart illustrating an exemplary method for identifying messaging completion on a parallel computer according to embodiments of the present invention.

For further explanation, FIG. 6 sets forth a flow chart illustrating a computer-implemented method for identifying messaging completion on a parallel computer (100). As described above, the parallel computer (100) of FIG. 6 includes a plurality of compute nodes, the compute nodes coupled for data communications by at least two independent data communications networks including a binary tree data communications network (106) optimal for collective operations that organizes the nodes as a tree and a torus data communications network (106) optimal for point to point operations that organizes the nodes as a torus.

The method of FIG. 6 includes determining (600) that all nodes have sent all queued messages. Determining (600) that all nodes have sent all queued messages is carried out by identifying that all software message queues for all the nodes have been completely drained and all messages have been injected into the network hardware.

The method of FIG. 6 includes reading (602) all counters at each node of the torus data communications network (106). Each compute node of the torus data communications network often includes a counter for each data communications link to the point to point adapter. Such a counter is incremented each time a message is sent or received using the data communications link.

The example of FIG. 6 illustrates three values (604) for each counter. This is only to illustrate plurality rather than to specify that there are three values. In fact, compute nodes useful in the present invention may have any number of counters and all such configurations are well within the scope of the present invention.

The method of FIG. 6 also includes calculating (606) at each node a current node value (608) in dependence upon the values (604) read from the counters at each node. A current node value is a single value that represents the current state of network traffic on the node. Calculating (606) at each node a current node value (608) in dependence upon the values (604) read from the counters at each node may be carried out by summing at each node all values read from the counters for the node.

The method of FIG. 6 also includes determining (612) for all nodes whether the current node value (608) for each node is the same as a previously calculated node value (610) for each node. A previously calculated node value (610) is a single valued that represents the previously checked state of network traffic on the node Determining (612) for all nodes whether the current node value (608) for each node is the same as the previously calculated node value (610) for each node may be carried out by performing an allreduce operation (614) on the binary tree data communications network (106) of the difference between the current node value for each node and the previously calculated node value for each node. An allreduce is a reduce operation whose results are sent to all processes. The result of an allreduce is typically the same as calling a reduce followed by a broadcast.

If the current node value is the same as the previously calculated node value for all nodes of the torus data communications network, the method of FIG. 6 includes determining that messaging is complete (618). That is, if the current node value is the same as the previously calculated node value for all nodes of the torus data communications network then no messages have been received by any node since the last calculation and therefore messaging is determined to be complete.

If the current node value is not the same as the previously calculated node value for all nodes of the torus data communications network, the method of FIG. 6 includes determining that messaging is currently incomplete (620). That is, if the current node value is not the same as the previously calculated node value for all nodes of the torus data communications network then messages have been received by at least one node and therefore messaging is determined to be incomplete.

If the current node is not the same as the previously calculated node value for all nodes of the torus data communications network the method also includes repeating (622) the steps of FIG. 6 until the current node is the same as the previously calculated node value for all nodes of the torus data communications network. That is, if the current node is not the same as the previously calculated node value for all nodes the method of FIG. 6 includes re-reading all counters at each node of the torus data communications network; calculating at each node a new current node value in dependence upon the values read from the counters at each node; and determining for all nodes whether the new current node value for each node is the same as the previously calculated node value for each node.

In the example of FIG. 6, if the current node value is the same as the previously calculated node value for all nodes of the torus data communications network, the method of FIG. 6 determines that messaging is complete (618). In some cases, however, network congestion may result in a current node value that is the same as the previously calculated node value even though messaging is not in fact complete. Some embodiments of the present invention therefore, include determining for all nodes whether the current node value for each node is the same as a plurality of previously calculated node value for each node. In such embodiments, the number of times the same node value must be calculated to determine that messaging is complete may be varied according to factors such as typical network traffic, operational speed of the parallel computer, and so on as will occur to those of skill in the art.

In even further embodiments, increasing the number of times that the same node value must be calculated to determine that messaging is complete may usefully replace the first step of FIG. 6. That is, as the number of times that the same node value must be calculated to determine that messaging is complete increases the importance of determining that all messages in all queues have been sent is reduced.

The example of FIG. 6 describes an example of an allreduce for determining (612) for all nodes whether the current node value (608) for each node is the same as a previously calculated node value (610) for each node. This is for explanation, and not for limitation. In fact, in some embodiments a global OR works may be used instead of an allreduce of the sum of the difference of the current node value and the previously calculated node value. The following pseudocode example demonstrates the use of a global OR:

```
Q( )
{
=============SOFTWARE CHECKING BEGINS==============
  while (! send_queue-> empty)
  advance( );
=============SOFTWARE CHECKING ENDS================
=============HARDWARE CHECKING BEGINS==============
  done = 0;
  barrier( );     // If late will everyone be a the correct stating point
  old = check(performance_counter);
  while (!done)
  {
    advance( );
    new = check(performance_counter);
    if (new != old)
    {
      done = all_reduce(NO);
    }
    else
    {
      done = all_reduce(YES);
    }
    old = new;
  }
}
==============HARDWARE CHECKING ENDS==============
//network has been silenced
```

Exemplary embodiments of the present invention are described largely in the context of a fully functional computer system for identifying messaging completion on a parallel computer. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for identifying messaging completion on a parallel computer, the parallel computer comprising a plurality of compute nodes, the compute nodes coupled for data communications by at least two independent data communications networks including a binary tree data communications network optimal for collective operations that organizes the nodes as a tree and a torus data communications network optimal for point to point operations that organizes the nodes as a torus, the method comprising:
  reading all counters at each node of the torus data communications network, each node of the torus data communications network containing a counter for each data communications link to a point to point adapter, each counter incremented each time a message is sent or received using the data communications link;
  calculating at each node a current node value in dependence upon the values read from the counters at each node, the current node value representing the current state of traffic on the node; and
  determining for all nodes whether the current node value for each node is the same as at least one previously calculated node value for each node; and
  if the current node value is the same as the previously calculated node value for all nodes of the torus data communications network, determining that messaging is complete in that no messages have been received by any node since calculating the previously calculated node value; and
  if the current node value is not the same as the previously calculated node value for all nodes of the torus data communications network, determining that messaging is currently incomplete in that one or more messages have been received by at least one node since calculating the previously calculated node value.

2. The method of claim 1 further comprising determining that all nodes have sent all queued messages prior to reading all counters at each node of the torus data communications network.

3. The method of claim 1 wherein calculating at each node a current node value in dependence upon the values read from the counters at each node further comprising summing at each node all values read from the counters for the node.

4. The method of claim 1 wherein determining for all nodes whether the current node value for each node is the same as at least one previously calculated node value for each node further comprises performing an allreduce operation on the binary tree data communications network of the difference between the current node value for each node and the previously calculated node value for each node.

5. The method of claim 1 wherein determining for all nodes whether the current node value for each node is the same as at least one previously calculated node value for each node further comprises determining for all nodes whether the current node value for each node is the same as a plurality of previously calculated node value for each node.

6. The method of claim 1 further comprising if the current node is not the same as the previously calculated node value for all nodes of the torus data communications network:
  re-reading all counters at each node of the torus data communications network;
  calculating at each node a new current node value in dependence upon the values read from the counters at each node; and
  determining for all nodes whether the new current node value for each node is the same as at least one previously calculated node value for each node.

7. A parallel computer for identifying messaging completion on a parallel computer, the parallel computer comprising a plurality of compute nodes, the compute nodes coupled for data communications by at least two independent data communications networks including a binary tree data communications network optimal for collective operations that organizes the nodes as a tree and a torus data communications network optimal for point to point operations that organizes the nodes as a torus, the parallel computer further comprising a computer processor, a computer memory operatively coupled to the computer processor, the computer memory having disposed within it computer program instructions capable of:
  reading all counters at each node of the torus data communications network, each node of the torus data communications network containing a counter for each data communications link to a point to point adapter, each counter incremented each time a message is sent or received using the data communications link;
  calculating at each node a current node value in dependence upon the values read from the counters at each node, the current node value representing the current state of traffic on the node; and
  determining for all nodes whether the current node value for each node is the same as at least one previously calculated node value for each node; and
  if the current node value is the same as the previously calculated node value for all nodes of the torus data communications network, determining that messaging is complete in that no messages have been received by any node since calculating the previously calculated node value; and
  if the current node value is not the same as the previously calculated node value for all nodes of the torus data communications network, determining that messaging is currently incomplete in that one or more messages have been received by at least one node since calculating the previously calculated node value.

8. The parallel computer of claim 7 wherein the computer memory also has disposed within it computer program instructions capable of determining that all nodes have sent all queued messages prior to reading all counters at each node of the torus data communications network.

9. The parallel computer of claim 7 wherein computer program instructions capable of calculating at each node a current node value in dependence upon the values read from the counters at each node further comprises computer program instructions capable of summing at each node all values read from the counters for the node.

10. The parallel computer of claim 7 wherein computer program instructions capable of determining for all nodes whether the current node value for each node is the same as at least one previously calculated node value for each node further comprise computer program instructions capable of performing an allreduce operation on the binary tree data communications network of the difference between the current node value for each node and the previously calculated node value for each node.

11. The parallel computer of claim 7 wherein computer program instructions capable of determining for all nodes whether the current node value for each node is the same as at least one previously calculated node value for each node further comprise computer program instructions capable of determining for all nodes whether the current node value for each node is the same as a plurality of previously calculated node value for each node.

12. The parallel computer of claim 7 wherein the computer memory also has disposed within it computer program instructions capable of:
    re-reading all counters at each node of the torus data communications network if the current node is not the same as the previously calculated node value for all nodes of the torus data communications network;
    calculating at each node a new current node value in dependence upon the values read from the counters at each node; and
    determining for all nodes whether the new current node value for each node is the same as at least one previously calculated node value for each node.

13. A computer program product for identifying messaging completion on a parallel computer, the parallel computer comprising a plurality of compute nodes, the compute nodes coupled for data communications by at least two independent data communications networks including a binary tree data communications network optimal for collective operations that organizes the nodes as a tree and a torus data communications network optimal for point to point operations that organizes the nodes as a torus, the computer program product disposed upon a computer readable medium, the computer program product comprising:
    computer program instructions for reading all counters at each node of the torus data communications network, each node of the torus data communications network containing a counter for each data communications link to a point to point adapter, each counter incremented each time a message is sent or received using the data communications link;
    computer program instructions for calculating at each node a current node value in dependence upon the values read from the counters at each node, the current node value represent ma the current state of traffic on the node; and
    computer program instructions for determining for all nodes whether the current node value for each node is the same as at least one previously calculated node value for each node; and
    computer program instructions for determining that messaging is complete in that no messages have been received by any node since calculating the previously calculated node value if the current node value is the same as the previously calculated node value for all nodes of the torus data communications network; and
    computer program instructions for determining that messaging is currently incomplete in that one or more messages have been received by at least one node since calculating the previously calculated node value if the current node value is not the same as the previously calculated node value for all nodes of the torus data communications network.

14. The computer program product of claim 13 further comprising computer program instructions for determining that all nodes have sent all queued messages prior to reading all counters at each node of the torus data communications network.

15. The computer program product of claim 13 wherein computer program instructions for calculating at each node a current node value in dependence upon the values read from the counters at each node further comprises computer program instructions for summing at each node all values read from the counters for the node.

16. The computer program product of claim 13 wherein computer program instructions for determining for all nodes whether the current node value for each node is the same as at least one previously calculated node value for each node further comprise computer program instructions for performing an allreduce operation on the binary tree data communications network of the difference between the current node value for each node and the previously calculated node value for each node.

17. The computer program product of claim 13 wherein computer program instructions for determining for all nodes whether the current node value for each node is the same as at least one previously calculated node value for each node further comprise computer program instructions for determining for all nodes whether the current node value for each node is the same as a plurality of previously calculated node value for each node.

18. The computer program product of claim 13 further comprising:
    computer program instructions for re-reading all counters at each node of the torus data communications network if the current node is not the same as the previously calculated node value for all nodes of the torus data communications network;
    computer program instructions for calculating at each node a new current node value in dependence upon the values read from the counters at each node; and
    computer program instructions for determining for all nodes whether the new current node value for each node is the same as at least one previously calculated node value for each node.

19. The computer program product of claim 13 wherein the computer readable medium comprises a recordable medium.

20. The computer program product of claim 13 wherein the computer readable medium comprises a transmission medium.

* * * * *